(12) United States Patent
Yang et al.

(10) Patent No.: US 8,634,185 B2
(45) Date of Patent: Jan. 21, 2014

(54) DATA STORAGE DEVICE CARRIER ASSEMBLY

(75) Inventors: Gui-Fang Yang, Wuhan (CN); Zhi-Ping Wu, Wuhan (CN); Ting-Ting He, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 163 days.

(21) Appl. No.: 13/430,817

(22) Filed: Mar. 27, 2012

(65) Prior Publication Data

US 2012/0327587 A1    Dec. 27, 2012

(30) Foreign Application Priority Data

Jun. 24, 2011    (CN) .......................... 2011 1 0172895

(51) Int. Cl.
*G06F 1/16*    (2006.01)

(52) U.S. Cl.
USPC .................. 361/679.37; 312/265.5; 248/694; 211/103

(58) Field of Classification Search
USPC ............... 455/575.4, 575.3, 572, 575.1, 570, 455/569.5, 557; 211/41.12, 103, 121, 26.2, 211/26; 248/220.21, 225.11, 298.1, 201, 248/309.1, 213.2, 694, 27.1, 27.3, 220.22, 248/217.4; 312/232.2, 232.1, 330.1, 1, 312/265.5, 350, 263, 249.13, 326, 332.1; 361/679.31, 679.33, 679.39, 679.01, 361/679.48, 679.51, 679.46, 679.4, 679.58, 361/679.21, 679.34, 679.37, 679.57, 361/679.32, 679.02, 679.35, 679.28, 679.6

See application file for complete search history.

(56) References Cited

U.S. PATENT DOCUMENTS

| 2005/0007734 A1* | 1/2005 | Peng et al. ..................... 361/685 |
| 2005/0068721 A1* | 3/2005 | Chen et al. ..................... 361/685 |
| 2005/0105266 A1* | 5/2005 | Wang ............................. 361/685 |
| 2012/0243167 A1* | 9/2012 | Chen et al. ............... 361/679.31 |

* cited by examiner

*Primary Examiner* — Hung Duong
(74) *Attorney, Agent, or Firm* — Altis Law Group, Inc.

(57) ABSTRACT

A data storage device assembly includes a drive bracket. The drive bracket includes a first side plate and a second side plate which faces to the first side plate. Each of the first side plate and the second side plate defines a slide way which is adapted to receive a data storage device assembly sliding therein. The first piece and a second piece is secured together on the first side plate. The second piece includes a pair of first bent pieces and a pair of second bent pieces connected to edges of the second piece. The pair of first bent pieces faces to each other. The pair of second bent pieces faces to each other. The pair of first bent pieces is secured to the pair of second bent pieces.

13 Claims, 4 Drawing Sheets

DATA STORAGE DEVICE CARRIER ASSEMBLY

BACKGROUND

1. Technical Field

The present disclosure relates to data storage device carrier assemblies, more particularly, to a data storage device carrier assembly for steadily mounting data storage devices.

2. Description of Related Art

Data storage devices, such as floppy disk drives or hard disk drives, are usually installed in a computer enclosure. The data storage device carriers are required to securely hold the storage devices and ensure that the storage devices run smoothly. However, because the data storage devices are often very heavy, the data storage device carriers are often deformed after a period of usage. Deformed data storage devices may not hold the storage devices tightly.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
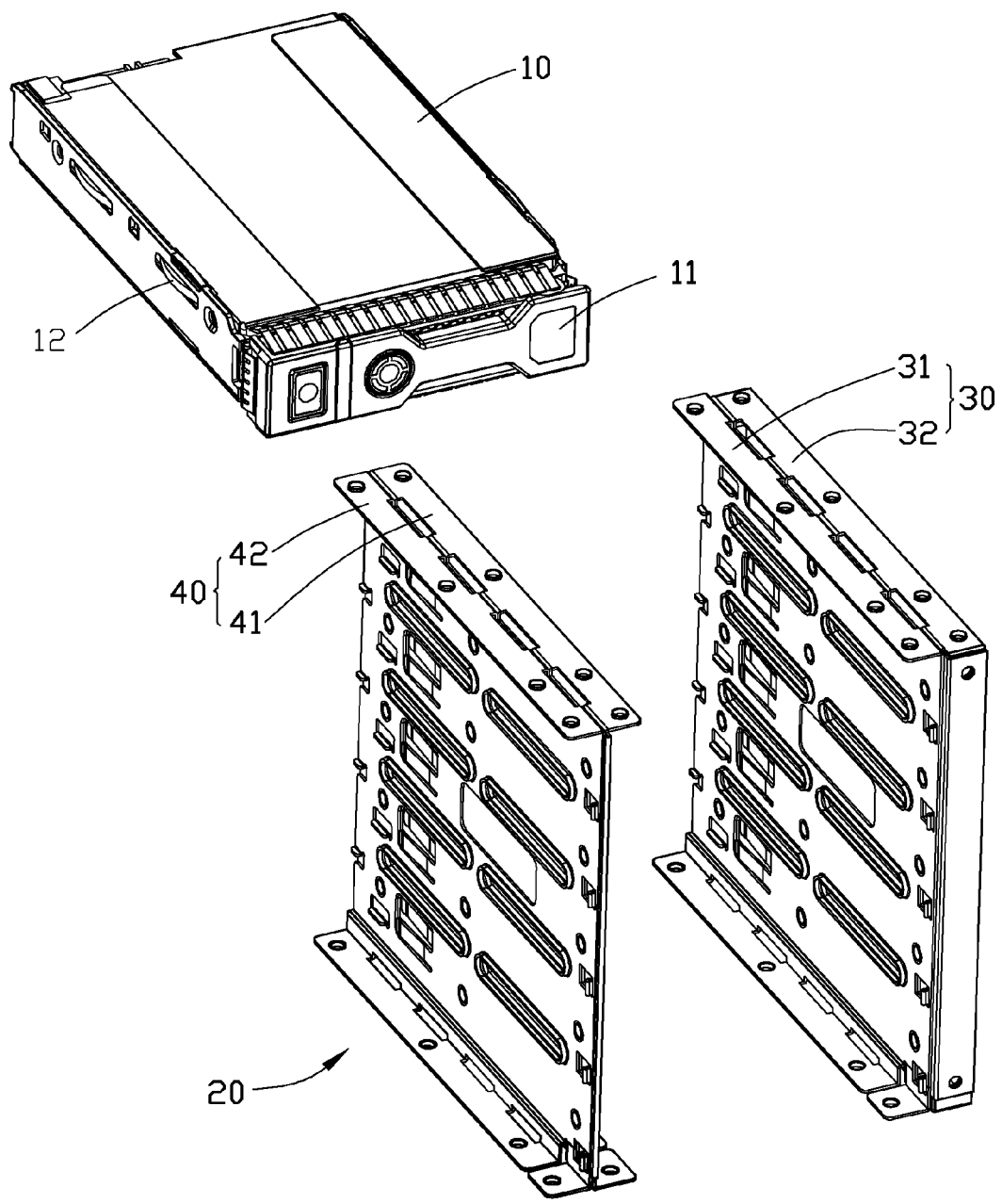
FIG. 1 is an exploded and isometric view of an embodiment of a data storage device carrier assembly and a data storage device.

Referring to FIG. 1, a data storage device carrier assembly in accordance with an embodiment is used to mounting a data storage device 10. The data storage device carrier includes a drive bracket 20. A handle 11 is pivotally mounted on a front portion of the data storage device 10. Each of left and right sides of the data storage device 10 is equipped with an elastic piece 12 which can shield electromagnetic interference.

The drive bracket 20 includes a first side plate 30 and a second side plate 40.

Figure 2:
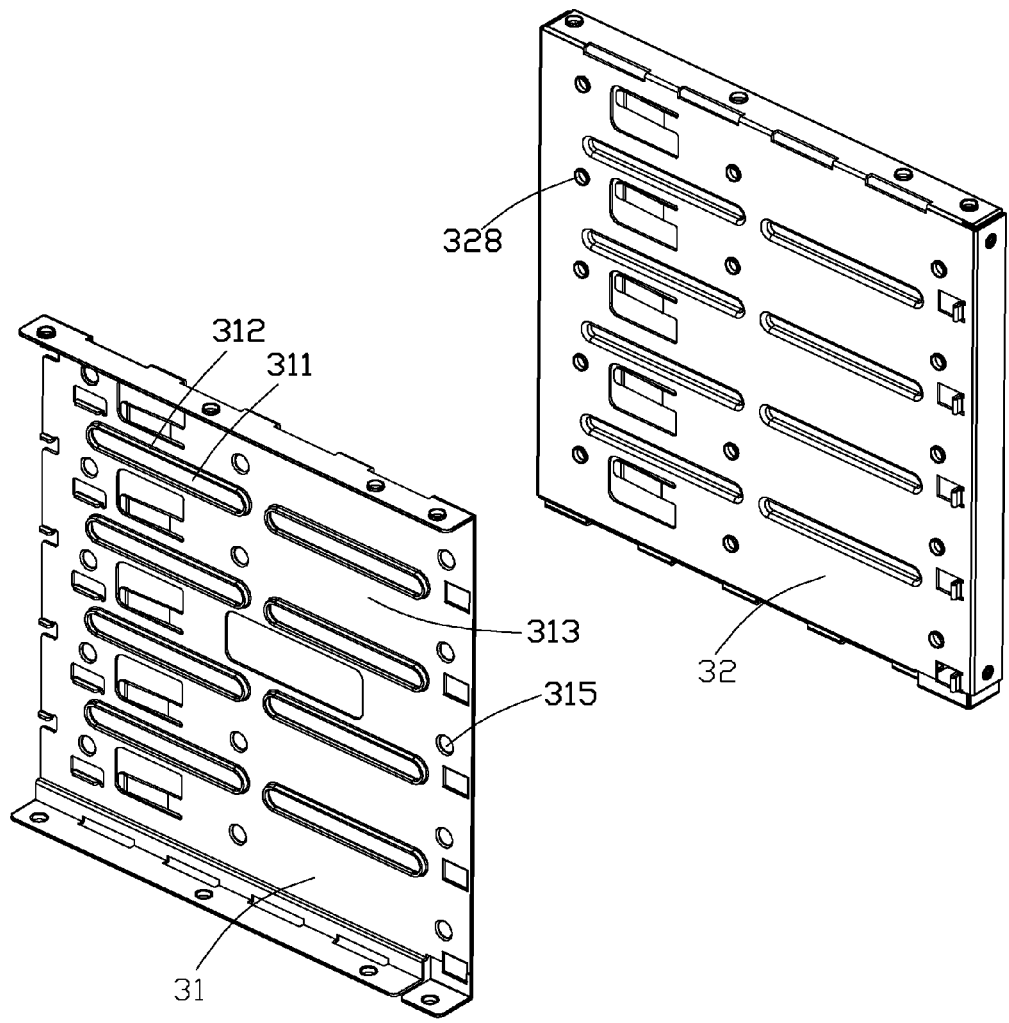
FIG. 2 is an exploded and isometric view of a first side plate of the data storage device carrier assembly of FIG. 1.
Figure 3:
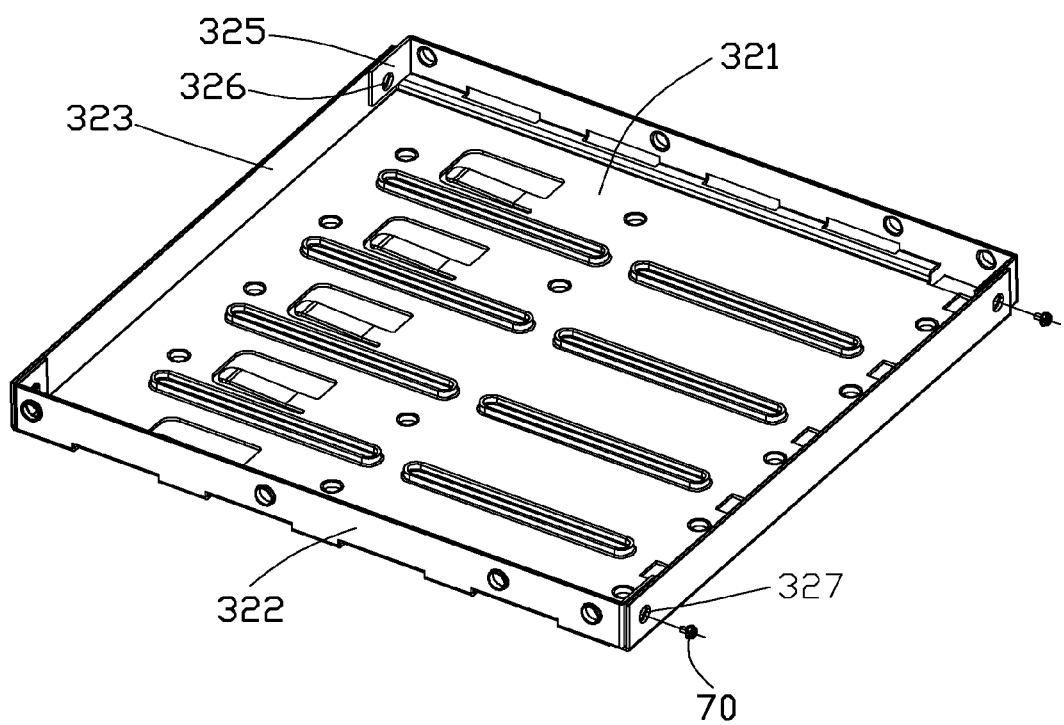
FIG. 3 is an assembled view of the first side plate of FIG. 2.
Figure 4:
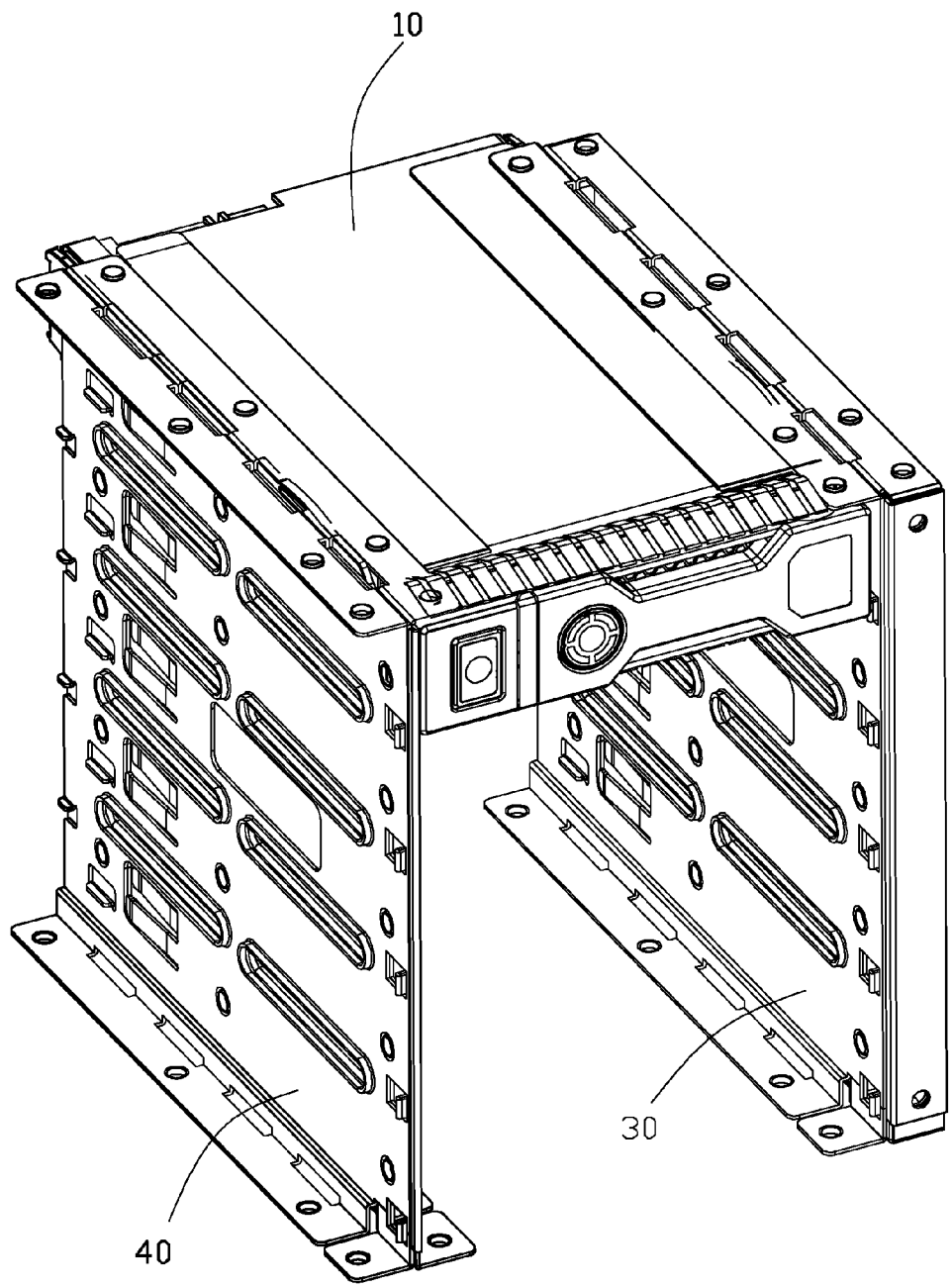
FIG. 4 is an assembled view of the data storage device carrier assembly of FIG. 1.

Referring to FIGS. 1 to 3, the first side plate 30 includes a first piece 31 and a second piece 32. A plurality of parallel grooves 311 is defined in the first piece 31. Edges of the plurality of parallel grooves 311 form a plurality of supporting flanges 312. A slide way 313 is defined between adjacent two of the plurality of supporting flanges 312. A plurality of mounting holes 315 is defined in the first piece 31.

The second piece 32 includes a rectangular main body 321. A pair of opposite edges of the main body 321 is bent to form a pair of first bent pieces 322. A pair of another opposite edges of the main body 321 is bent to form a pair of second bent pieces 323. Each of the pair of first bent pieces 322 is substantially perpendicular to each of the pair of second bent pieces 323. Two ends of each of the pair of first bent pieces 322 extend towards the pair of second bent pieces 323 to form two extending portions 325. Each of the two extending portion 325 is overlapped on corresponding one of the pair of second bent pieces 323. A first through hole 326 is defined in each of the two extending portions 325. A second through hole 327 is defined in each of the pair of second bent pieces 323. The first through hole 326 is aligned to the second through hole 327. A fastener 70 is secured in the first through hole 326 and the second through hole 327 to enhance Each of the pair of first bent pieces 322 and each of the pair of second bent pieces 323. A plurality of mounting posts 328 is located on the second piece 32 corresponding to the plurality of mounting holes 315 of the first piece 31.

The second side plate 40 includes a third piece 41 and a fourth piece 42. The third piece 41 faces to the fourth piece 42. The third piece 41 forms a plurality of supporting flanges (not shown) corresponding to the plurality of supporting flanges 312 of the first piece 31. A slide way (not shown) is defined between two adjacent flanges of the third piece 41. The fourth piece 42 is similar to the second piece 32.

Referring to FIGS. 1 to 4, in assembly, the plurality of mounting posts 328 is secured in the plurality of mounting holes 315 to secure the first piece 31 and the second piece 32 together. The third piece 41 and the fourth piece 42 are secured together as that of the first piece 31 and the second piece 32. The data storage device 10 slides in the slide way 313. The plurality of supporting flanges 312 of the first side plate 30 and corresponding supporting flanges of the third piece 41 support the data storage device 10 thereon. The elastic pieces 12 of the data storage device 10 abut the first side plate 30 and the second side plate 40 to shield EMI. Then, the data storage device 10 is secured between the first side plate 30 and the second side plate 40 in some conventional manners, such as screws, clasps, and so on.

In the data storage device carrier assembly, both of the first side plate 30 and the second side plate 40 comprises two pieces. Furthermore, Each of the pair of first bent pieces 322 and each of the pair of second bent pieces 323 are secured together. The second piece 32 has a great strength. Therefore, Each of the pair of first bent pieces 322 and each of the pair of second bent pieces 323 are not easily to be deformed, even if a plurality of data storage devices is mounted in the data storage device carrier.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the invention to the full extent indicated by the broad general meaning of the terms in which the appended claims are expressed.

What is claimed is:

1. A data storage device assembly, comprising:
a drive bracket comprising a first side plate and a second side plate facing the first side plate, each of the first side plate and the second side plate defining a slide way adapted to slidably receive a data storage device assembly; and
a first piece and a second piece secured together on the first side plate, the second piece comprising a pair of first bent pieces and a pair of second bent pieces connected to edges of the second piece, the pair of first bent pieces facing each other, the pair of second bent pieces facing each other, and each of the pair of first bent pieces being secured to each of the pair of second bent pieces.

2. The data storage device assembly of claim 1, wherein ends of each of the pair of first bent pieces extend towards each of the pair of second bent pieces to form a pair of extending portions, each of the pair of extending portions is secured to each of the pair of second bent pieces.

3. The data storage device assembly of claim 2, wherein each of the pair of extending portions defines a first through hole, each of the pair of second bent pieces defines a second through hole, and a fastener is secured in the first through hole and the second through hole.

4. The data storage device assembly of claim 1, wherein a plurality of supporting flanges is formed on a side of the first side plate, and the slide way is defined between each adjacent two of the plurality of supporting flanges.

5. The data storage device assembly of claim 4, wherein the plurality of supporting flanges are configured to support the data storage device thereon.

6. The data storage device assembly of claim 1, wherein the first piece defines a plurality of mounting holes, the second piece forms a plurality of mounting posts, and each of the plurality of mounting posts is secured in each of the plurality of mounting holes.

7. The data storage device assembly of claim 1, wherein the second side plate comprises a third piece and a fourth piece, and the third piece and the fourth piece are secured together.

8. A data storage device assembly, comprising:
a data storage device, each of two opposite sides of the data storage device equipped with an elastic piece;
a drive bracket comprising a first side plate and a second side plate, each of the first side plate and the second side plate defining a supporting flange, the supporting flange is configured to support the data storage device thereon, and each of the elastic piece of the data storage device abutting each of the first side plate and the second side plate, and the first side plate comprising a first piece and a second piece secured together with the first piece.

9. The data storage device assembly of claim 8, wherein the second piece comprises a pair of first bent pieces and a pair of second bent pieces connected to edges of the second piece, the pair of first bent pieces faces each other, the pair of second bent pieces faces each other, and each of the pair of first bent pieces is secured to each of the pair of second bent pieces.

10. The data storage device assembly of claim 9, wherein ends of each of the pair of first bent pieces extend towards each of the pair of second bent pieces to form a pair of extending portions, each of the pair of extending portions is secured to each of the pair of second bent pieces.

11. The data storage device assembly of claim 10, wherein each of the pair of extending portions defines a first through hole, each of the pair of second bent pieces defines a second through hole, and a fastener is secured in the first through hole and the second through hole.

12. The data storage device assembly of claim 8, wherein the first piece defines a plurality of mounting holes, the second piece forms a plurality of mounting posts, and each of the plurality of mounting posts is secured in each of the plurality of mounting holes.

13. The data storage device assembly of claim 8, wherein the second side plate comprises a third piece and a fourth piece, and the third piece and the fourth piece are secured together.

* * * * *